United States Patent Office 3,098,057
Patented July 16, 1963

3,098,057
PROPYLENE POLYMER STABILIZED WITH A SYN-
ERGISTIC COMBINATION OF A PARA-TERTI-
ARYALKYL PHENOL-FORMALDEHYDE RESIN
AND A DITHIOPHOSPHATE
Bernard O. Baum, Plainfield, N.J., assignor to Union
Carbide Corporation, a corporation of New York
No Drawing. Filed Jan. 5, 1960, Ser. No. 497
11 Claims. (Cl. 260—43)

This invention relates to improved propylene polymer compositions. More particularly, it relates to polypropylene having greatly increased resistance to light and thermal degradation and being substantially light in color.

Solid polypropylene is recognized in the plastics industry as possessing great commercial potential because of some advantages it has over polyethylene. For example, it has a higher melting temperature, a lower density and greater stiffness moduli than polyethylene. Polypropylene polymers can be produced in amorphous or crystalline form depending upon the catalysts employed and the reaction conditions. The highly crystalline polypropylenes having melt indices (measured at 190° C.) within the range of from about 0.01 to about 50 are particularly suitable for use in the production of fibers, films and other extruded and molded items. These high molecular weight, highly crystalline polypropylenes are characterized by their clarity, their high toughness and strength, their good mechanical resiliency and their high stiffness moduli.

Unfortunately, propylene polymers are subject to severe deterioration from the oxidative action of air at elevated temperatures. For example, fibers that are melt spun from polypropylene and have high initial strengths, 4 to 5 grams per denier, lose about 50 percent of their strength within about 50 hours after being placed in a circulating air oven at 125° C., and tend to disintegrate completely within about 100 hours to a powdery material. The stability of unstabilized crystalline polypropylene to heat aging also varies with the amount of impurities or catalyst residue remaining in the polymer, and in certain cases, the polymer is so unstable that fibers produced therefrom disintegrate within 5 to 10 hours at 125° C. This susceptibility of polypropylene to deteriorate under such conditions is much greater than that observed with most other high molecular weight polyolefin resins. This can be seen when one considers that unstabilized polyethylene fibers can withstand 500 hours at 100° C. without serious loss in strength.

While it is known that small amounts of some antioxidants, for example, 4,4'-thio-bis(6-tertiarybutyl-3-methylphenol), 2,2-bis(4-hydroxyphenyl)propane, diphenylamine, etc., can be added to polypropylenes to prevent degradative effects during the short period the polymer is heated for melt spinning to produce fibers, it is not possible by the use of these conventional and well known anti-oxidants to prevent the oxidative degradation that occurs over prolonged exposure to air at temperatures below the melting temperature of polypropylene. For example, the inclusion in a polypropylene fiber of two percent by weight of 4,4'-thio-bis(6-tertiarybutyl-3-methylphenol), which is known to be one of the most effective anti-oxidants for polyethylene, increases the time of exposure at 125° C. required to cause 50 percent loss in strength from 50 hours to only about 150 hours. It can be seen that this is still inferior to unstabilized polyethylene fibers.

Polypropylene can be stabilized against thermally induced degradation with a great variety of phenolic resins, among which are the uniquely effective p-tertiaryalkylphenol-formaldehyde resins. The so stabilized polypropylene compositions are more resistant to air oxidation and thermal degradation during compounding and are able to endure the forming temperatures with no significant reduction of strength or electrical properties. However, relatively large concentrations, i.e., 0.1 to 1 percent are needed to provide the degree of stabilization generally required especially for fiber applications. Unfortunately, the phenolic resins impart a brownish-yellow color to the polypropylene. The higher the concentration of the phenolic resin the greater is the discoloration.

It is therefore the general object of the present invention to provide propylene resin compositions containing phenolic resin stabilizers which are even more stable toward light and thermal degradation than heretofore known and in addition are much improved with respect to color.

This general object as well as others which will be obvious from the specification and the appended claims is achieved by the compositions of the present invention which comprise a normally solid polymer of propylene, a p-tertiaryalkylphenol-formaldehyde resin, and an O,O'-diester of dithiophosphoric acid or metal salt thereof.

The low molecular weight para-tertiaryalkylphenol-formaldehyde resins suitable for use in this invention are the A-stage resins produced by the reaction of para-tertiaryalkylphenols with formaldehyde in the presence of a catalyst. The A-stage of a phenol-formaldehyde resin is the early stage in the production of those thermosetting resins in which the product produced is still soluble in certain liquids and fusible. This stage in the production of thermosetting resins is distinguished from the B-stage and C-stage. The B-stage is an intermediate stage in the reaction of a thermosetting resin in which the product softens when heated and swells when in contact with certain liquids, but does not entirely fuse or dissolve. The C-stage is the final stage in the reactions of a thermosetting resin in which the material is relatively insoluble and infusible. Thermosetting resins in a fully cured state are in this stage.

The A-stage resins used as anti-oxidants in this invention are those produced by the reaction of para-tertiaryalkylphenols with formaldehyde in the presence of a suitable catalyst, such as oxalic acid, by procedures which are well known in the plastics art. Among the para-tertiaryalkylphenols which can be used in producing the suitable A-stage resins by reaction with formaldehyde are the para-tertiaryalkylphenols, in which the alkyl group contains from 4 to about 20 carbon atoms or more, preferably from 4 to about 10 carbon atoms, such as para-tertiarybutylphenol, para-tertiaryamylphenol, para-tertiaryheptylphenol, para-tertiarynonylphenol and the like.

Illustrative of the A-stage resins that can be used to control the oxidative degradation of polypropylene are para-tertiarybutylphenol-formaldehyde resin, para-tertiaryamylphenol-formaldehyde resin, para-tetiarynonylphenol-formaldehyde resin, para-tertiaryldodecylphenol-formaldehyde resin and the like. The resins can be prepared from the pure para-phenol or from a mixture of para phenol with the ortho and/or meta isomers. However, the effectiveness of the A-stage resins as anti-oxidants is dependent in very large measure upon the para-tertiaryalkylphenol content in the resin. Thus, even though an A-stage resin formed from a mixture of isomeric alkyl-phenols having a major proportion of the paraisomer is an effective constituent of the present compositions, larger quantities of the A-stage resin are needed in order to have a sufficient concentration of the para-tertiaryalkylphenol-formaldehyde resin in the polypropylene to give equivalent stabilization to that achieved when a para-tertiarybutylphenol-formaldehyde resin produced from para-tertiarybutylphenol alone is utilized. Also, mixtures of two or more para-tertiaryalkylphenol-formaldehyde resins can be employed.

The O,O'-diesters of dithiophosphoric acid and the salts thereof which are suitably employed in the compositions of the present invention have the general formula

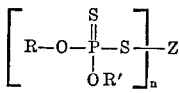

wherein R and R' are each a monovalent hydrocarbon radical containing from 1 to 16 carbon atoms such as alkyl, aryl, aralkyl, alkaryl, cycloalkyl, and alkyl substituted cycloalkyl groups, and Z is an element selected from the Groups I and II of the Mendeléeff Periodic System of Elements and having an atomic weight less than 150, and $n$ equals the valence of Z.

The monovalent hydrocarbon radicals represented by R and R' in the general formula include such specific groups as ethyl, propyl, isopropyl, butyl, t-butyl, 2-ethylhexyl, n-octyl, dodecyl, tetradecyl, hexadecyl, cyclohexyl, phenyl, tolyl, ethylphenyl, t-butylphenol, xylyl, cyclopentyl, ethylcyclopentyl, naphthyl, α-ethylnaphthyl, biphenyl and the like. Monovalent radicals which contain only ether oxygen in addition to carbon and hydrogen, such as alkoxyalkyl groups are well known in the art to exhibit substantially the same chemical reactivity as hydrocarbon radicals and are therefore intended to be within the scope of the present invention.

The group of elements represented by Z in the general formula includes hydrogen, lithium, sodium, potassium, copper, rubidium, silver, cesium, beryllium, magnesium, calcium, zinc, strontium, cadmium, barium. The preferred elements are hydrogen, the alkali metals, and the alkaline earth metals and zinc, with hydrogen and zinc being particularly preferred. By the term "Mendeléeff Periodic Table" or the term "Periodic System of Elements" as used throughout the specification is meant the classical periodic arrangement of the chemical elements developed by Dmitri Mendeléeff in which the elements are arranged in tabular form on the basis of chemical properties such as shown in the "Handbook of Chemistry and Physics," 30th ed., 1947, Chemical Rubber Publishing Co., Cleveland, Ohio (pp. 310-311).

Illustrative, but not limitative, of the general class of O,O'-diesters of dithiophosphoric acid and salts thereof are diisopropyl dithiophosphoric acid, zinc diisopropyldithiophosphate, dibutyldithiophosphoric acid, potassium dibutyldithiophosphate, diphenyldithiophosphoric acid, cuprous diphenyldithiophosphate, di-(phenylethyl)dithiophosphoric acid, calcium di-(phenylethyl)dithiophosphate, barium ditolyldithiophosphate, dicyclohexyldithiophosphoric acid, beryllium dicyclopentyldithiophosphate, di-(ethylcyclohexyl)dithiophosphoric acid, cadmium ditetradecyldithiophosphate, di - (2 - methoxyethyl)dithiophosphoric acid, and the like.

Propylene resin compositions having improved heat and light stability and greatly improved color are, according to this invention, those which contain from about 0.05 percent by weight to about 5.0 percent by weight or greater, preferably from about 0.5 to about 2.0 percent by weight, of an A-stage para-tertiary-alkylphenol-formaldehyde resin hereinbefore described based on the weight of the propylene polymer present, and in combination therewith, an O,O'-diester of dithiophosphoric acid or salt thereof as hereinbefore described in an amount of from about 10 to about 600 percent, preferably from about 20 to about 200 percent by weight based on the weight of the phenolic resin stabilizer present.

Whereas the proportion of A-stage phenolic resin to propylene polymer and the proportion of the phosphorus-containing synergist or promoter to A-stage phenolic resin as set forth above are satisfactory to produce a stable product having a light color suitable for all but the most unusual use requirements, it is to be understood that greater or lesser quantities of either the phenolic resin or the phosphorus containing synergist can be utilized without departing from the spirit and proper scope of the present invention. In a practical sense, however, greater latitude can be exercised with respect to the concentration of the phenolic resin stabilizer than with the phosphorus-containing synergist.

The phenolic resin stabilizer and the phosphorus-containing synergist can be incorporated into the propylene polymer by any suitable conventional means, as for example, by fluxing the propylene polymer with the stabilizer composition on heated rolls, by the use of Banbury mixers, or of heated extruders, and the like.

The following examples will serve to further illustrate the present invention.

In the examples, at each occurrence the following definitions and characterizations apply:

*Yellowness index.*—The yellowness index reported is the quotient of the degree of yellowness divided by the degree of whiteness of any given polypropylene composition tested. Yellowness and whiteness are based on color reflectance measurements made on molded plaque samples by means of a spectro-photometer modified for reflectance measurements (Beckman Model "B" abridged). The reflectance over vitrolite, an arbitrarily chosen reflectance standard, was measured on the plaque samples at wave lengths of 550 mμ and 430 mμ. Whiteness is based on the percentage reflectance at 550 mμ and yellowness is based on the percentage reflectance at 430 mμ. The yellowness index is therefore equal to $$\frac{R_{550\ m\mu} - R_{430\ m\mu}}{R_{550\ m\mu}}$$

in which R is the percentage reflectance at the wave length indicated by the subscript. The smaller the quotient, the lighter the color of the composition.

*Polypropylene resin.*—The propylene homopolymer employed is a typical normally solid polypropylene having a melt index of 3.1 decigrams per minute, a density of 0.908 gram per milliliter at 23° C. and a tensile modulus of 138,000 pounds per square inch.

*MIDF (melt index depreciation factor).*—The ratio of melt index of polypropylene resin or resin composition after heating 15 minutes at 288° C. compared to the initial melt index. The melt index determination was in accordance with ASTM test D–1238–52T.

*Thermal stability (induction period in hours in air at 150° C.).*—As a measure of the thermal stability, the composition tested was compression molded into 30 mil thick plaques which were then suspended in a 150° C. circulating air oven. Periodically the plaques were examined and subjected to a manually applied bending force. The plaques either sustained the applied force without discernible ill effect or crumbled into small powdery fragments. The plaques did not exhibit any in-between behavior. The time period during which the plaque could resist the applied force is called the induction period.

*Phenolic stabilizer.*—(a) p-t-Amylphenol/CH$_2$O resin: An A-stage para-tertiaryamylphenol-formaldehyde resin having a softening point of 185° F. prepared by the oxalic acid catalyzed condensation of para-tertiaryamylphenol and formaldehyde under reflux conditions. The condensation product mass was then vacuum distilled to remove formed water, unreacted phenol, and low molecular weight condensation products, and thereafter cooled and ground; (b) p-t-butylphenol/$CH_2O$ resin: An A-stage p-tertiarybutylphenol-formaldehyde resin having a softening point of 266° F. and a specific gravity of 1.04 prepared by the oxalic acid catalyzed condensation of p-tertiarybutylphenol and formaldehyde under reflux conditions.

EXAMPLES 1-9

The synergistic stabilizing action of an A-stage para-tertiaryalkylphenol-formaldehyde resin stabilizer and an O,O'-diester of dithiophosphoric acid or the metal salt thereof was demonstrated by preparing a series of polypropylene compositions, some of which contained both a phenolic resin stabilizer and a phosphorus-containing synergist of this invention, and some of which contain only the phosphorus. The compositions were prepared by admixing the modifiers with the polypropylene immediately after the polypropylene had been fluxed and sheeted on a two-roll mill at 170° C. The modifiers were thoroughly blended with the fluxed polypropylene by successively end-passing the mixture through the mill nip ten times. For control the same polypropylene was hot processed according to the same procedure, one portion receiving no modifiers, and other portions being admixed with different concentrations of phenolic resin stabilizer only. A portion of each of the compositions was compression molded and subjected to thermal abuse at 150° C. under oxidative conditions. The results are reported in Table I below.

propylene against air oxidation at 150° C., but cause pronounced yellowing, and that both the stabilizing action and the yellowing become greater with increasing phenolic resin concentration. It is also apparent that the phosphorus-containing synergists, when used alone, have a small to negligible effect on the stability of polypropylene in air at 150° C. However, when the phosphorus-containing synergists are employed in combination with the phenolic resin stabilizer, the stabilizing effect of said resin is greatly upgraded, and the color, particularly in compositions containing the metal salts of the phosphoric acid diesters, is improved. The combination of the phenolic resin stabilizer and the phosphorus-containing synergist provides a degree of stability which could not otherwise be attained without causing the color to become unacceptable for many commercial applications. Particularly with respect to stabilizing polypropylene against embrittlement in air at 150° C., the diesters of phosphoric acid are unusually effective. With respect to stabilizing polypropylene against thermal degradation at high temperatures, i.e., 288° C., the metal salts of the diesters are surprisingly effective alone.

EXAMPLE 10

The effects of concentration of additives in the polypropylene compositions of this invention were determined by preparing a series of compositions according to the procedure of Examples 1-9 containing various amounts of phenolic resin stabilizer and/or zinc diisopropyldithiophosphate or O,O'-di-(2-ethylhexyl)dithiophosphoric acid, and testing the compositions thus obtained for resistance toward embrittlement in air at 150° C. The formulations and results are set forth in Table II below.

*Table I*

| Ex. | Polypropylene composition Additives | Conc. of additives [1] | Yellowness index | Thermal stability (induction period at 150° C. in air, hrs.) | MIDF at 288° C. |
|---|---|---|---|---|---|
| Controls | None | | 0.39 | 4 | 15.0 |
| | Zinc diisopropyldithiophosphate | 0.1 | 0.41 | 4 | 12.0 |
| | do | 0.5 | 0.45 | 4 | 2.7 |
| | Potassium diisopropyldithiophosphate | 0.5 | 0.45 | 4 | 5.0 |
| | O,O'-di-(2-ethylhexyl)dithiophosphoric acid | 0.5 | | 12 | |
| | Cadmium diisopropyldithiophosphate | 0.5 | 0.57 | 4 | 6.0 |
| | p-t-Amylphenol/$CH_2O$ resin | 0.5 | 0.67 | 32 | 1.4 |
| | do | 1.0 | 0.78 | 48 | 1.3 |
| | do | 2.0 | 0.85 | 100 | 1.5 |
| | P-t-Butylphenol/$CH_2O$ resin | 0.5 | 0.67 | 30 | 1.6 |
| | do | 1.0 | 0.78 | 60 | 1.3 |
| 1 | p-t-Amylphenol/$CH_2O$ resin plus O,O'-di-(2-ethylhexyl)dithiophosphoric acid | 1.0 0.5 | 0.70 | 170 | |
| 2 | p-t-Amylphenol/$CH_2O$ resin plus Zinc diisopropyldithiophosphate | 0.5 0.5 | 0.47 | 120 | 1.8 |
| 3 | p-t-Amylphenol/$CH_2O$ resin plus Zinc diisopropyldithiophosphate | 0.5 0.1 | 0.53 | 100 | 2.4 |
| 4 | p-t-Amylphenol/$CH_2O$ resin plus O,O'-di-(p-t-butylphenyl)dithiophosphoric acid | 1.0 0.5 | 0.39 | 170 | |
| 5 | p-t-Amylphenol/$CH_2O$ resin plus Potassium diisopropyldithiophosphate | 0.5 0.5 | 0.47 | 64 | 1.7 |
| 6 | p-t-Amylphenol/$CH_2O$ resin plus O,O'-dicresyldithiophosphoric acid | 1.0 0.5 | 0.61 | 170 | |
| 7 | p-t-Amylphenol/$CH_2O$ resin plus O,O'-bis[2-(β-ethylbutoxy)ethyl] dithiophosphoric acid | 1.0 0.5 | 0.63 | 170 | |
| 8 | p-t-Amylphenol/$CH_2O$ resin plus Cadmium diisopropyldithiophosphate | 0.5 0.5 | 0.71 | 48 | 3.0 |
| 9 | p-t-Butylphenol/$CH_2O$ resin plus Zinc diisopropyldithiophosphate | 0.5 0.5 | 0.47 | 96 | 2.6 |

[1] Percent by weight based on the weight of polypropylene.

It can readily be seen from the data in Table I that the phenolic resins, when used alone, stabilize poly-

Table II

| A, phenolic resin [2] | B, zinc diisopropyl-dithiophosphate | C, O,O'-di-(2-ethylhexyl) dithiophosphoric acid | Total (A+B) | Total (A+C) | B/A | C/A | Induction period (hrs.) in air at 150° C. |
|---|---|---|---|---|---|---|---|
| 0    | 0    | 0    | 0    | 0    | ---- | ---- | 4 |
| 0    | 0.1  | ---- | 0.1  | ---- | ---- | ---- | 4 |
| 0    | 0.5  | ---- | 0.5  | ---- | ---- | ---- | 4 |
| 0    | 1.0  | ---- | 1.0  | ---- | ---- | ---- | 4 |
| 0    | ---- | 0.1  | ---- | 0.1  | ---- | ---- | 6 |
| 0    | ---- | 0.5  | ---- | 0.5  | ---- | ---- | 12 |
| 0    | ---- | 1.0  | ---- | 1.0  | ---- | ---- | 16 |
| 0.05 | 0.02 | ---- | 0.07 | ---- | 0.4  | ---- | 16 |
| 0.10 | 0    | ---- | 0.10 | ---- | 0    | ---- | 8 |
| 0.10 | 0.05 | ---- | 0.15 | ---- | 0.5  | ---- | 22 |
| 0.10 | 0.10 | ---- | 0.20 | ---- | 1.0  | ---- | 29 |
| 0.30 | 0.06 | ---- | 0.36 | ---- | 0.2  | ---- | 64 |
| 0.35 | 0.70 | ---- | 1.05 | ---- | 2.0  | ---- | 68 |
| 0.50 | 0    | ---- | 0.50 | ---- | 0    | ---- | 32 |
| 0.50 | 0.05 | ---- | 0.55 | ---- | 0.1  | ---- | 72 |
| 0.50 | 0.10 | ---- | 0.60 | ---- | 0.2  | ---- | 100 |
| 0.50 | 0.50 | ---- | 1.00 | ---- | 1.0  | ---- | 120 |
| 0.70 | 0.35 | ---- | 1.05 | ---- | 0.5  | ---- | 94 |
| 1.00 | 0    | ---- | 1.00 | ---- | 0    | ---- | 48 |
| 0.05 | ---- | 0.02 | ---- | 0.07 | ---- | 0.4  | 24 |
| 0.10 | ---- | 0.10 | ---- | 0.20 | ---- | 1.0  | 37 |
| 0.50 | ---- | 0.05 | ---- | 0.55 | ---- | 0.1  | 114 |
| 0.50 | ---- | 0.50 | ---- | 1.00 | ---- | 1.0  | 140 |
| 1.00 | ---- | 0.50 | ---- | 1.50 | ---- | 0.33 | 170 |

[1] Based on the weight of polypropylene.
[2] p-t-Amylphenol/CH$_2$O resin.

The phosphorus-containing compounds in synergistic combination with the A-stage phenolic resins in accordance with this invention are also effective as stabilizers for copolymers of propylene with other olefinically unsaturated monomers such as ethylene and styrene. The term "propylene resin" as used herein is, therefore, intended to include such copolymers containing at least 50 percent by weight interpolymerized propylene, preferably about 80 percent by weight, as well as propylene homopolymers.

EXAMPLE 11

A styrene-propylene copolymer having a melt index of about 0.03 and containing an interpolymerized styrene to propylene ratio of 18:82 was blended with 0.5 percent by weight of the p-tert-butylphenol-formaldehyde resin stabilizer of Examples 1–9. A portion of this blend was further blended with zinc diisopropyl dithiophosphate in an amount of 0.5 percent by weight of the overall composition. Each of the two compositions was compression molded and yellowness index determinations made. The yellowness index of the copolymer composition containing only the phenolic resin stabilizer was found to be 0.47. The yellowness index of the composition containing the zinc diisopropyldithiophosphate was 0.28.

The polypropylene compositions of the present invention find particular utility, because of their resistance to oxidation degradation, as extruded or spun textile fibers and yarns. These compositions find additional utility in the form of films and sheets suitable for packaging, and in the form of a wide variety of extruded and molded articles.

The composition can also include conventional additives such as colorants, lubricants, slip agents, plasticizers, fillers and the like, and can be admixed with other polymeric materials either compatible or incompatible with polypropylene.

What is claimed is:

1. A propylene resin composition having improved stability toward heat and light induced molecular degradation which comprises a normally solid propylene polymer, a stabilizing amount of an A-stage para-tertiaryalkylphenol-formaldehyde resin in which the alkyl group of the para-tertiaryalkylphenol contains from 4 to 20 carbon atoms, and a synergistic phosphorus-containing compound having the general formula

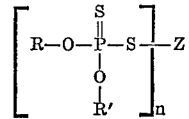

wherein R and R' are each a monovalent hydrocarbon radical containing from 1 to 16 carbon atoms, Z is an element selected from Group I and Group II of the Mendeléeff Periodic System of Elements and having an atomic weight of less than 150, and $n$ is an integer having a value equal to the positive valence of Z.

2. A stabilized propylene resin composition comprising a normally solid propylene polymer, an A-stage para-tertiaryalkylphenol-formaldehyde resin in which the alkyl group of the para-tertiaryalkylphenol contains from 4 to 20 carbon atoms, said A-stage resin being present in an amount of from about 0.05 to about 5.0 percent by weight based on the weight of the propylene polymer, and a synergistic phosphorus-containing compound having the general formula

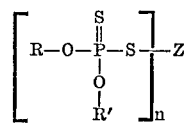

wherein R and R' are each a monovalent hydrocarbon radical containing from 1 to 16 carbon atoms, Z is an element selected from Group I and Group II of the Mendeléeff Periodic System of Elements, and having an atomic weight of less than 150, said synergist being present in an amount of from about 10 to about 600 percent by weight based on the weight of the A-stage para-tertiaryalkylphenol-formaldehyde resin.

3. The composition of claim 2 wherein R and R' are each an alkyl group.

4. The composition of claim 2 wherein R and R' are each an isopropyl group.

5. The composition of claim 2 wherein Z is hydrogen.

6. The composition of claim 2 wherein Z is zinc.

7. The composition of claim 2 wherein Z is an alkali metal.

8. The composition of claim 2 wherein the alkyl group of the para-tertiaryalkylphenol contains from 4 to 10 carbon atoms.

9. The composition of claim 2 wherein the phosphorus-containing synergist is present in an amount of from about 20 to about 200 percent by weight based on the weight of the A-stage para-tertiaryalkylphenol-formaldehyde resin.

10. The composition of claim 8 wherein the alkyl group is tertiary amyl.

11. The composition of claim 8 wherein the alkyl group is tertiary butyl.

References Cited in the file of this patent

UNITED STATES PATENTS

| | | |
|---|---|---|
| 2,163,637 | Thomas | June 27, 1939 |
| 2,240,582 | Sparks | May 6, 1941 |
| 2,735,835 | Wicklatz et al. | Feb. 21, 1956 |
| 2,801,987 | Fortune | Aug. 6, 1957 |
| 2,878,213 | Jenkins et al. | Mar. 17, 1959 |
| 2,906,731 | Hill et al. | Sept. 29, 1959 |
| 2,968,641 | Roberts et al. | Jan. 17, 1961 |
| 3,013,003 | Maragliano et al. | Dec. 12, 1961 |
| 3,020,259 | Schulde et al. | Feb. 6, 1962 |